(12) United States Patent
Okada et al.

(10) Patent No.: US 9,074,965 B2
(45) Date of Patent: Jul. 7, 2015

(54) EXHAUST GAS ANALYZING DEVICE, MANAGEMENT DEVICE FOR EXHAUST GAS ANALYZING DEVICE AND MANAGEMENT PROGRAM FOR EXHAUST GAS ANALYZING DEVICE

(71) Applicant: HORIBA, Ltd., Kyoto (JP)

(72) Inventors: Kaoru Okada, Kyoto (JP); Masayuki Hayata, Kyoto (JP); Toru Yamazaki, Kyoto (JP)

(73) Assignee: HORIBA, Ltd., Kyoto (JP)

( * ) Notice: Subject to any disclaimer, the term of this patent is extended or adjusted under 35 U.S.C. 154(b) by 0 days.

(21) Appl. No.: 13/672,894

(22) Filed: Nov. 9, 2012

(65) Prior Publication Data

US 2013/0118229 A1     May 16, 2013

(30) Foreign Application Priority Data

Nov. 10, 2011   (JP) ................. 2011-246281

(51) Int. Cl.
   *G01N 33/497*   (2006.01)
   *G01M 15/10*    (2006.01)
   *G01D 3/02*     (2006.01)

(52) U.S. Cl.
   CPC ............ *G01M 15/10* (2013.01); *G01D 3/022* (2013.01)

(58) Field of Classification Search
   CPC ...... Y02T 10/47; Y02T 10/46; G01N 1/2252; G01N 15/0656; G01N 27/4077; G01N 33/00; G01N 33/06; F01N 11/00; F02D 37/02; F02D 2041/001; F02D 41/0002
   USPC .............. 73/1.06, 31.05, 118.01, 23.31; 123/406.44, 406.48
   See application file for complete search history.

(56) References Cited

U.S. PATENT DOCUMENTS

| | | | |
|---|---|---|---|
| 2005/0116722 A1 | 6/2005 | Wolter | |
| 2006/0265261 A1* | 11/2006 | Wetzer et al. | 705/7 |
| 2009/0189738 A1 | 7/2009 | Hermle | |
| 2010/0064769 A1* | 3/2010 | Wang | 73/23.31 |
| 2012/0151991 A1* | 6/2012 | Ester | 73/23.31 |

(Continued)

FOREIGN PATENT DOCUMENTS

| | | |
|---|---|---|
| CN | 201035022 Y | 3/2008 |
| GB | 2284059 A | 5/1995 |

(Continued)

OTHER PUBLICATIONS

Horiba Automotive Test Systems, No. HRA-2248C, MEXA 7000 Version 3, Sep. 2010, Japan, 40 pages.

(Continued)

*Primary Examiner* — Peter Macchiarolo
*Assistant Examiner* — Mohammed Keramet-Amircola
(74) *Attorney, Agent, or Firm* — Brooks Kushman P.C.

(57) ABSTRACT

The present invention is intended to be able to restore a setting of an exhaust gas analyzing device to an initial setting at the time of product shipment or the latest maintenance setting performed prior to the corresponding maintenance in the maintenance of the exhaust gas analyzing device. The present invention includes a setting data storage part (55) storing initial setting data indicating initial setting information of each part constituting an exhaust gas analyzing device (2) in a state of product shipment and the latest maintenance setting data indicating the latest maintenance setting information of each part constituting the exhaust gas analyzing device (2) in the latest maintenance.

6 Claims, 7 Drawing Sheets

(56) References Cited

U.S. PATENT DOCUMENTS

| | | | |
|---|---|---|---|
| 2012/0160009 A1* | 6/2012 | Asami et al. | 73/23.31 |
| 2012/0312075 A1* | 12/2012 | Schimpl et al. | 73/23.31 |
| 2013/0133400 A1* | 5/2013 | Jaeger et al. | 73/23.31 |
| 2013/0312489 A1* | 11/2013 | Watanabe et al. | 73/23.31 |

FOREIGN PATENT DOCUMENTS

| | | |
|---|---|---|
| JP | 08159967 | 6/1996 |
| JP | 09127122 | 5/1997 |
| JP | 2003-149099 A | 5/2003 |
| JP | 2004045347 | 2/2004 |
| JP | 2005351679 | 12/2005 |
| JP | 2006005525 A | 1/2006 |
| JP | 2006275754 A | 10/2006 |
| JP | 2007086412 | 4/2007 |
| JP | 2009286184 | 12/2009 |
| JP | 2010233671 | 10/2010 |
| JP | 2011075468 | 4/2011 |
| JP | 2011209054 | 10/2011 |

OTHER PUBLICATIONS

Hiroshi Kawamura, Automotive Development and Progress in Horiba's Emission Measurement Technologies, Readout, No. 34, Jan. 31, 2009, Japan, 12 pages.

Kaoru Okada, Motor Exhaust Gas Analyzer MEXA-7000 Series 3. Data Processing System and Communications Line, Readout, No. 11, Sep. 8, 1995, Japan, 9 pages.

Hideki Ohashi et al., Motor Exhaust Gas Analyzer MEXA-7000 Series 1. Product Concept, Readout, No. 11, Sep. 8, 1995, Japan, 7 pages.

Kenji Takeda, et al., Motor Exhause Gas Analyzer MEXA-7000 Series 2. Downsizing and Modular Configuration of Analyzers, Readout, No. 11, Sep. 8, 1995, Japan, 7 pages.

Office Action dated Apr. 3, 2015 issued for Chinese patent application No. 201210440004.2, 7 pgs.

* cited by examiner

US 9,074,965 B2

EXHAUST GAS ANALYZING DEVICE, MANAGEMENT DEVICE FOR EXHAUST GAS ANALYZING DEVICE AND MANAGEMENT PROGRAM FOR EXHAUST GAS ANALYZING DEVICE

CROSS-REFERENCE TO RELATED APPLICATION

This application claims priority to Japanese Application No. 2011-246281 filed Nov. 10, 2011, the disclosure of which is incorporated in its entirety by reference herein.

FIELD

The present invention relates to an exhaust gas analyzing device for analyzing components contained in exhaust gas exhausted from such as, for example, an engine, and to a management device and management program for use in the exhaust gas analyzing device.

BACKGROUND

As an exhaust gas analyzing system of this kind, there is one adapted to measure carbon monoxide (CO), total hydrocarbons (THC), nitrogen oxides ($NO_X$), carbon dioxide ($CO_2$) and the like contained, for example, in engine exhaust gas exhausted from an engine of an automobile.

Specifically, the exhaust gas analyzing system mentioned above includes an exhaust gas flow line for rendering engine exhaust gas to flow therethrough and an exhaust gas analyzing device provided in the exhaust gas flow line to measure the various kinds of components mentioned above contained in the exhaust gas flowing through the corresponding exhaust gas flow line.

Then, in the exhaust gas analyzing system mentioned above, at the time of product shipment of the exhaust gas analyzing device, initial setting data indicating types of gas analyzers contained in the corresponding exhaust gas analyzing device and initial setting values such as calculation factor information such as a calibration curve factor, calibration factor and the like of each of the gas analyzers is recorded in an external recording medium such as a CD-R so as to be appended to the exhaust gas analyzing device. Then, it is necessary to perform regular maintenance for the exhaust gas analyzing device, and the initial setting values (such as, e.g., a calibration curve factor and a calibration factor) are changed by performing the corresponding maintenance.

However, in the case where it is desired to return back to the setting values before starting the corresponding maintenance so as to reset again due to reasons such as erroneously changing the setting values in the maintenance, only the initial setting data at the time of product shipment is available in the conventional exhaust gas analyzing device, and therefore such a resetting operation cannot be performed.

In addition, although the initial setting data at the time of product shipment can be restored by reading the initial setting data stored in the external recording medium appended to the exhaust gas analyzing device, the work thereof is complicated and in the case where the state before starting the maintenance is different from the initial state, it is not possible yet to return back to a desired state. In particular, in the case where other analyzers are added after product shipment, the setting values set in relation to the added other analyzers disappear only by returning back to the initial state, and it may be likely inexpedient to return back to the initial setting values in some cases.

SUMMARY

Therefore, the present invention has its essential object to eliminate the need to prepare initial setting data with use of an external recording medium in the maintenance of the exhaust gas analyzing device and allow the setting of the exhaust gas analyzing device to return not only to the initial setting at the time of product shipment but also to the latest maintenance setting performed before the corresponding maintenance.

Solution to Problem

That is, an exhaust gas analyzing device according to the present invention is characterized by including a setting data storage part adapted to store initial setting data indicating initial setting information of each part constituting the exhaust gas analyzing device in a state of product shipment and the latest maintenance setting data indicating the latest maintenance setting information of each part constituting the exhaust gas analyzing device in the latest maintenance.

With this configuration, since the exhaust gas analyzing device includes the setting data storage part and the initial setting data and the latest maintenance setting data are stored in the setting data storage part, the setting of the exhaust gas analyzing device can be returned to the initial setting or the latest maintenance setting only by reading the initial setting data or the latest maintenance data stored in the setting data storage part. In this way, the setting work of the exhaust gas analyzing device at the time of maintenance can be facilitated. Also, there is no need to prepare the initial setting data using the external recording medium.

In addition, since various types of gas analyzers included in the exhaust gas analyzing device are changed or degraded in sensitivity with time lapse, such as calibration curve factors and calibration factors thereof are to be changed every maintenance. Thus, by storing the latest maintenance setting data, the setting information of the exhaust gas analyzing device can be returned to the latest maintenance setting information so that the setting work can be facilitated. Moreover, also in the case where another gas analyzer is added to the exhaust gas analyzing device after product shipment, there is a merit in storing the latest maintenance setting data. For example, in the case where an $NO_X$ meter is newly added, a setting value for controlling the corresponding $NO_X$ meter, a calibration curve factor and calibration factor for calculating an $NO_X$ concentration are not included in the initial setting information and therefore it is necessary to store the latest maintenance setting data including these pieces of information. It is noted that there is no case of returning the setting information of the exhaust gas analyzing device to the maintenance setting information older than the latest maintenance setting information in the current maintenance process, and therefore there is merely a slight merit in storing the old maintenance setting data indicating the old maintenance setting information.

In order to automatically store the latest maintenance setting information in the setting data storage part every time a maintenance is performed, it is desirable that the exhaust gas analyzing device includes a maintenance setting data updating part adapted to update the latest maintenance setting data stored in the setting data storage part every time the exhaust gas analyzing device is subjected to maintenance. With this configuration, there is no need for an operator to input maintenance setting information one by one piece and occurrence of an input leakage or erroneous input can be prevented.

It is desirable that the exhaust gas analyzing device further includes a setting reset part adapted to reset the setting of each part constituting the exhaust gas analyzing device to initial setting information indicated by the initial setting data or the latest maintenance setting information indicated by the latest maintenance setting data. With this configuration, the setting of each part constituting the exhaust gas analyzing device can be automatically returned to the initial setting information or the latest maintenance setting information.

It is desirable that the exhaust gas analyzing device further includes a display control part adapted to display a setting selection screen on a display for selecting the initial setting information or the latest maintenance setting information, wherein the setting reset part retrieves the setting data indicating the initial setting information or the latest maintenance setting information selected by the setting selection screen from the setting data storage part. With this configuration, an operator may select the initial setting information or the latest maintenance information on the setting selection screen by displaying the setting selection screen on the display so that the operability of the operator can be improved.

In addition, an exhaust gas analyzing device according to the present invention is characterized by including a setting data storage part adapted to store initial setting data indicating initial setting information of each part constituting the exhaust gas analyzing device in a state of product shipment and the latest maintenance setting data indicating the latest maintenance setting information of each part constituting the exhaust gas analyzing device in the latest maintenance.

Moreover, a management program for an exhaust gas analyzing device according to the present invention is characterized by causing a computer to execute a function as a setting data storage part adapted to store initial setting data indicating initial setting information of each part constituting the exhaust gas analyzing device in a state of product shipment and the latest maintenance setting data indicating the latest maintenance setting information of each part constituting the exhaust gas analyzing device in the latest maintenance.

Advantageous Effects of Invention

According to the present invention configured as described above, it becomes possible to eliminate the need to prepare initial setting data with use of an external recording medium in the maintenance of the exhaust gas analyzing device and allow the setting of the exhaust gas analyzing device to return not only to the initial setting at the time of product shipment but also to the latest maintenance setting performed before the corresponding maintenance.

DETAILED DESCRIPTION

The following describes an exhaust gas analyzing system 100 according to the present invention referring to the accompanying drawings.

Figure 1:
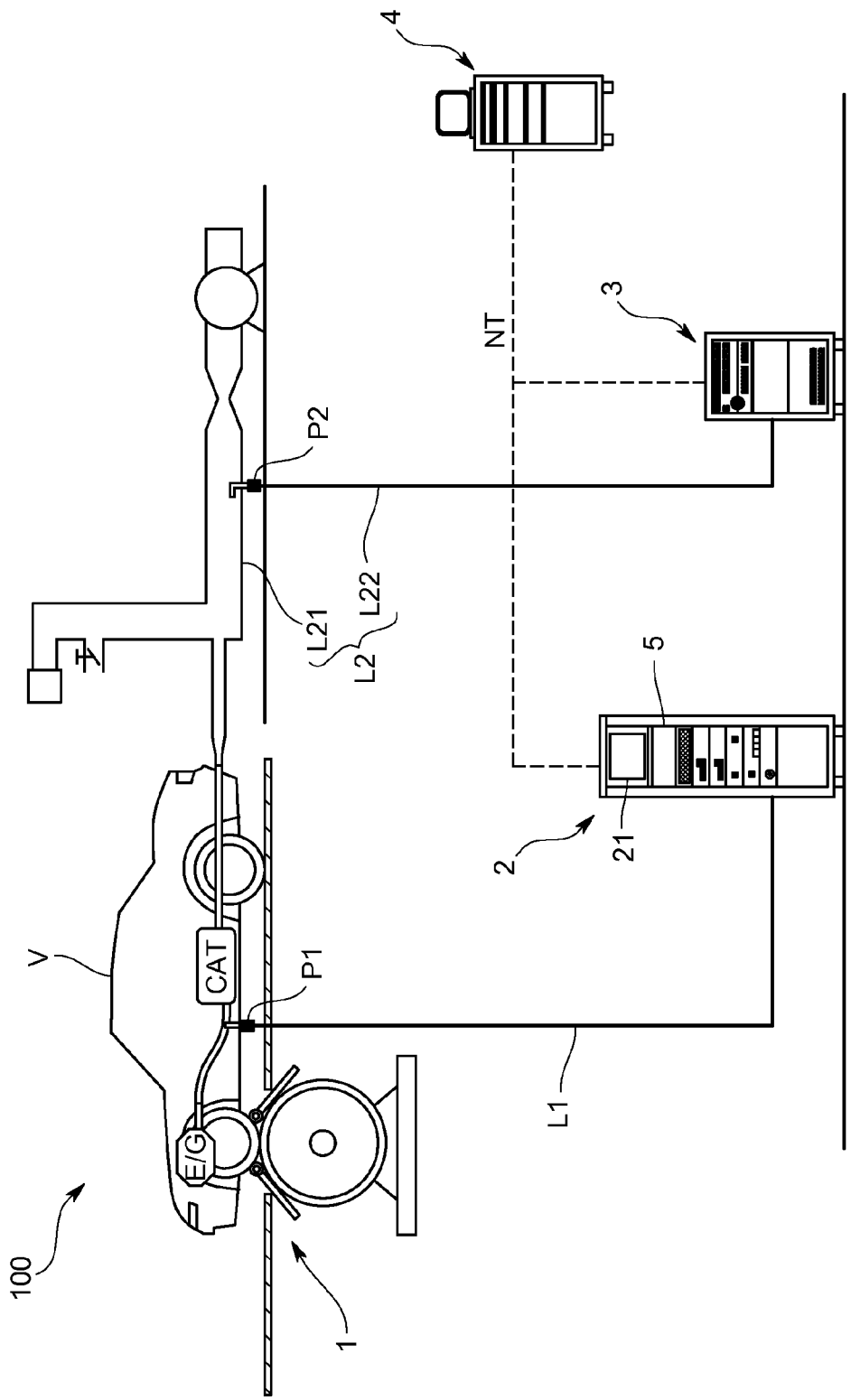
FIG. 1 is a schematic diagram showing a configuration of an exhaust gas analyzing system of the present embodiment.

The exhaust gas analyzing system 100 of the present embodiment is intended to perform an exhaust gas measurement of a vehicle V in a room referred to as a test cell and, as the entire configuration thereof shown in FIG. 1, the system 100 includes: a chassis dynamometer 1 on which the vehicle V that is a specimen in installed; first and second exhaust gas analyzing devices 2 and 3 analyzing various components contained in the exhaust gas exhausted from an engine of the vehicle V; an exhaust gas flow line L leading the exhaust gas exhausted from the engine to the first and second exhaust gas analyzing devices 2 and 3; and a central information processing unit 4 sending and receiving data between a dynamo control unit (not shown) controlling the chassis dynamometer 1 and each of the exhaust gas analyzing devices 2 and 3. Also, the exhaust gas analyzing system 100 includes an automatic drive mechanism installed at a driver's seat of a vehicle V and an automatic drive mechanism control unit for controlling the automatic drive mechanism (both of which are not shown), wherein the automatic drive mechanism is provided with a drive arm for mechanically driving an accelerator, brake, gear shift lever, handle and the like so that the vehicle V is automatically driven on the chassis dynamometer 1 by operating the drive arm based on an external control signal.

The exhaust gas flow line L includes: a first exhaust gas flow line L1 for leading engine exhaust gas exhausted from an engine to the first exhaust gas analyzing device 2 without diluting the engine exhaust gas; and a second exhaust gas flow line L2 for diluting the engine exhaust gas through a dilution tunnel L21 and leading the diluted engine exhaust gas to the second exhaust gas analyzing device 3, wherein the engine exhaust gas is discharged from the engine and passed through a catalyst (CAT) so as to be exhausted from an exhaust pipe (tail pipe).

The first exhaust gas flow line L1 includes an introduction port P1 having one end provided in an exhaust tube so that the engine exhaust gas discharged from the engine is introduced therein and the other end connected to a connection port (not shown) of the first exhaust gas analyzing device 2 so that the first exhaust gas flow line L1 configures a direct sampling line for directly sampling the engine exhaust gas.

In addition, the second exhaust gas flow line L2 includes: the dilution tunnel L21 that is connected to the exhaust pipe of the vehicle V so as to dilute the engine exhaust gas with air; and a dilution sampling line L22 having an introduction port P2 with its one end provided in the dilution tunnel L21 so as to introduce the diluted exhaust gas and the other end connected to a connection port (not shown) of the second exhaust gas analyzing device 3.

The first exhaust gas analyzing device 2 is equipped with a plurality of gas analyzers having different measurement principles that are measuring instruments capable of continuously and individually measuring respective components such as CO, $CO_2$, $O_2$, HC, THC, $CH_4$, NO and $NO_X$ contained in the engine exhaust gas. For example, this first exhaust gas analyzing device 2 includes: an infrared gas analyzer using a non-dispersive infrared (NDIR) absorption method for measuring concentrations of CO, $CO_2$, HC and NO; an $NO_X$ meter using a chemi-luminescence detection (CLD) method for measuring a concentration of $NO_X$; an $O_2$ meter using a magnetic pressure type detection (PMD) method for measuring a concentration of $O_2$; a THC meter using a heating-type flame ionization detection (HFID) method for measuring a concentration of THC and a $CH_4$ meter using a gas chromatography/hydrogen ionization detector (GC-FID) for measuring a concentration of $CH_4$.

Herein, this first exhaust gas analyzing device 2 is equipped with a computer system configured by using such as a CPU and a memory and has a function capable of mutually communicating such as a control signal and data with the outside.

The second exhaust gas analyzing device 3 is equipped with a plurality of gas analyzers having different measurement principles that are measuring instruments capable of continuously and individually measuring respective components such as THC, $CH_4$ and NO contained in the diluted exhaust gas. For example, this second exhaust gas analyzing device 3 includes: an infrared gas analyzer using a non-dispersive infrared (NDIR) absorption method for measuring a concentration of NO; a THC meter using a heating-type flame ionization detection (HFID) method for measuring a concentration of THC and a $CH_4$ meter using a gas chromatography/hydrogen ionization detector (GC-FID) for measuring a concentration of $CH_4$.

Herein, this second exhaust gas analyzing device 3 is equipped with a computer system configured by using such as a CPU and a memory and has a function capable of mutually communicating such as a control signal and data with the outside.

The central information processing unit 4 is a computer system equipped with, for example, a CPU, a memory, a communication interface, a display, input means and the like and has a server function. Thus, the central information processing unit 4 is rendered to send and receive data to and from each of the various control units mentioned above and the first and second exhaust gas analyzing devices 2 and 3 via a network NT such as a LAN so that it is allowed to execute a centralized control of the various control units and first and second exhaust gas analyzing devices 2 and 3 and further execute data management.

Then, for example, by giving necessary parameters such as vehicle information and driving mode to the central information processing unit 4, the chassis dynamometer 1 and the automatic driving mechanism are centralizedly controlled via the control units thereof so that the vehicle V is driven in a desired manner and the first and second exhaust gas analyzing devices 2 and 3 are operated to perform an automatic measurement of the exhaust gas data. Further, the exhaust gas data and driving data thereof are collectively managed in this central information processing unit 4.

It is noted here that the central information processing unit 4, each of the control units and the first and second exhaust gas analyzing devices 2 and 3 are not necessarily separated in a physically independent distribution as shown in FIG. 1, and an aspect of partially or entirely integrating these components may be of course adoptable.

By this way, under such a configuration, in the exhaust gas analyzing system 100 according to the present embodiment, the first exhaust gas analyzing device 2 includes a management device 5 for the exhaust gas analyzing device for managing the setting information of the corresponding exhaust gas analyzing device 2.

Figure 2:
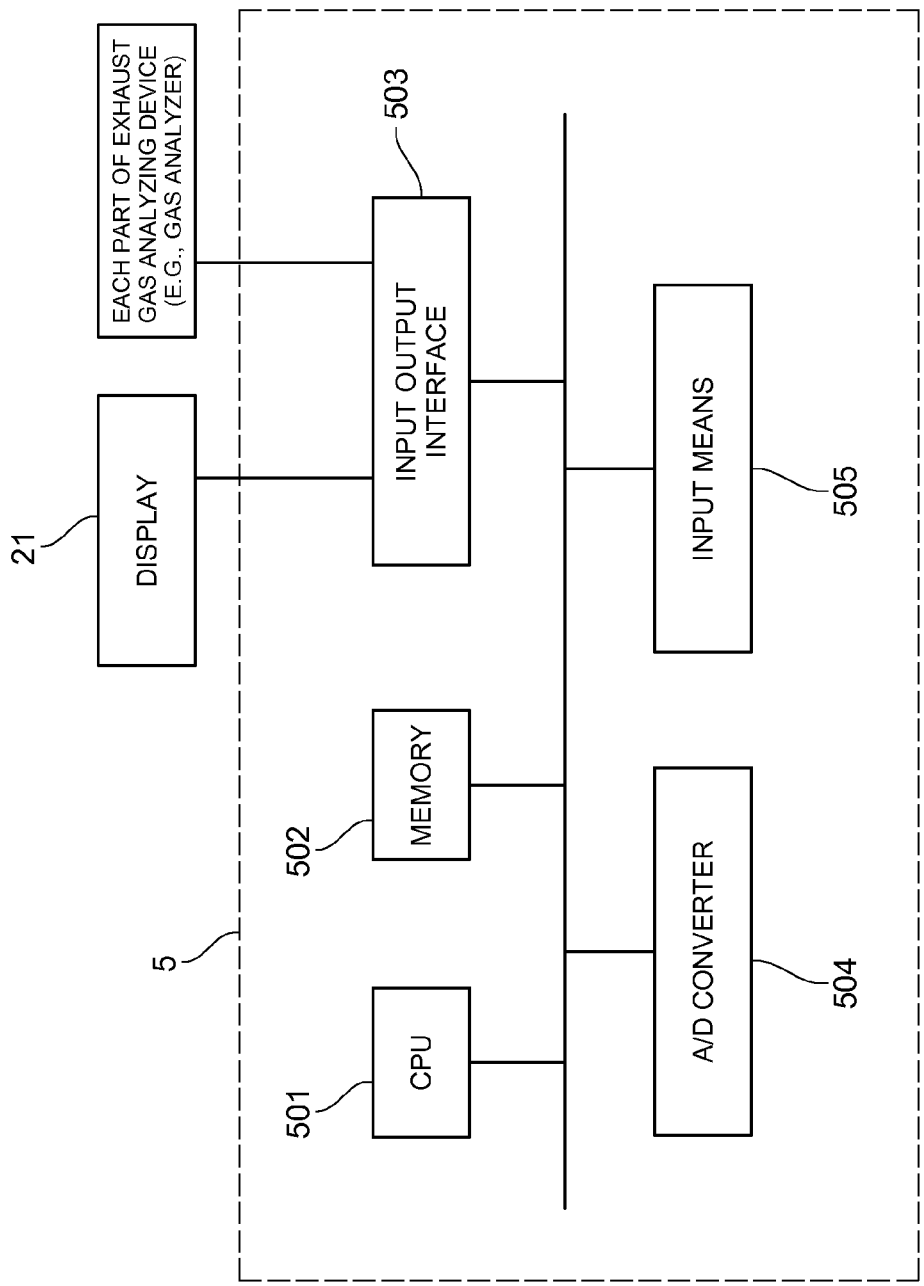
FIG. 2 is an equipment configuration diagram of a management device of the same embodiment.
Figure 3:
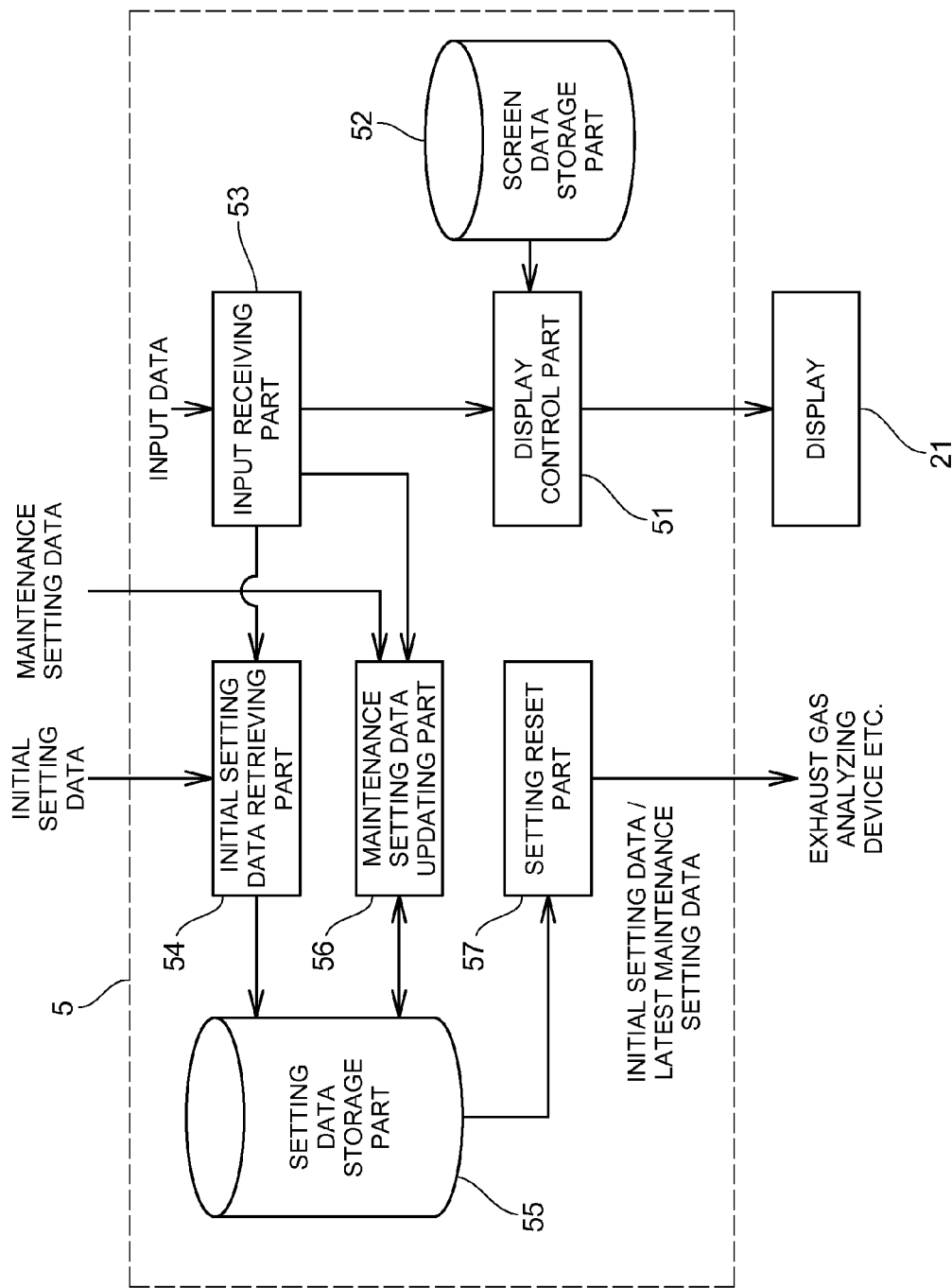
FIG. 3 is a functioning configuration diagram of a management device of the same embodiment.

As shown in FIG. 2, this management device 5 is a general-purpose or dedicated computer equipped with a CPU 501, a memory 502, an input/output interface 503, an A/D converter 504, input means 505 and the like. In this configuration, by cooperating the CPU 501 and peripheral equipment, etc. in accordance with a prescribed program stored in a predetermined region of the memory 502, functions as a display control part 51, screen data storage part 52, input receiving part 53, initial setting data retrieving part 54, setting data storage part 55, maintenance setting data updating part 56, setting reset part 57 and the like are effected as shown in FIG. 3. It is noted here that, although the management device 5 is adapted to execute the display 21 of the first exhaust gas analyzing device 2 in a screen display, it may be also possible to include a dedicated display other than the corresponding display 21.

The following describes an operation of the management device 5 along with the functions of each of the parts 51 to 57 of the corresponding management device 5 referring to FIGS. 3 to 7.

Figure 4:
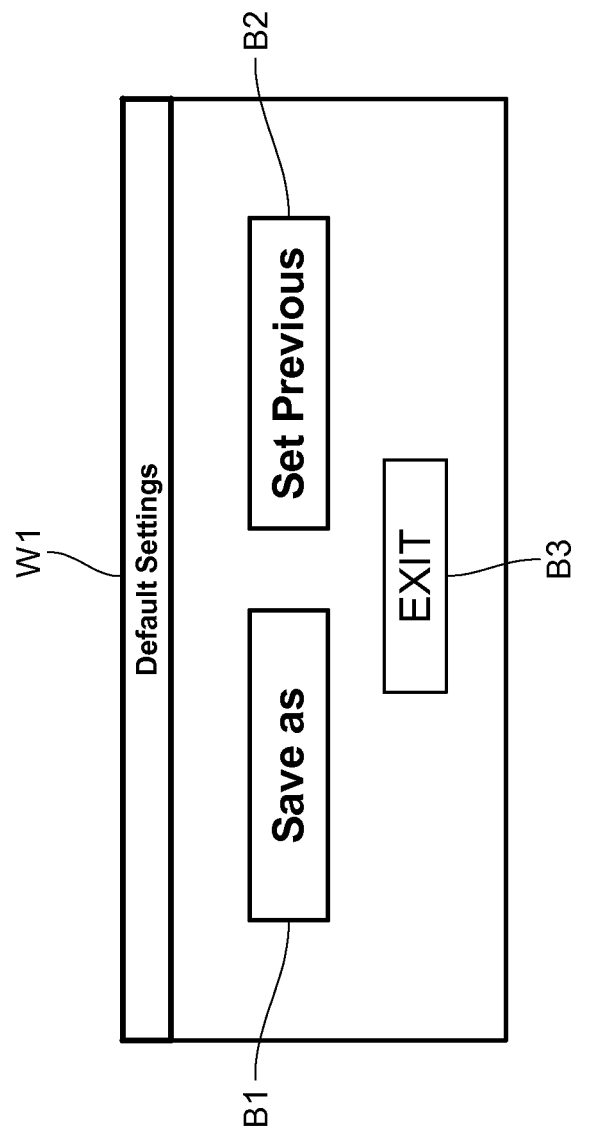
FIG. 4 is a diagram showing a process selection screen of the same embodiment.

When an operator selects a maintenance setting mode by the input means 505, the input receiving part 53 retrieves a corresponding mode selection signal and sends the signal to the display control part 51. The display control part 51 retrieved this mode selection signal retrieves process selection screen data indicative of a process selection screen W1 as shown in FIG. 4 from the screen data storage part 52 so as to display a process selection screen W1 on the display 21.

This process selection screen W1 includes: a setting information saving screen button ("Save as") B1 for displaying a setting information saving screen W2 for saving the latest maintenance setting data indicative of the initial setting data indicating the initial setting information of each part constituting the exhaust gas analyzing device 2 or the latest maintenance setting information; and a reset selection screen button ("Set Previous") B2 for displaying a reset selection screen W3 for resetting the setting of each part constituting the exhaust gas analyzing device 2 to the initial setting information or the latest maintenance setting information. In addition, a close button ("EXIT") B3 is also included for closing the process selection screen W1.

Under the condition that the process selection screen W1 is being displayed, if an operator clicks any of the buttons B1 to B3 by the input means 505 such as a mouse, button selection data corresponding to the input data is received by the input receiving part 53. Then, this button selection data is transmitted to the display control part 51.

The display control part 51 retrieving the button selection data retrieves screen data indicating the screens W2 and W3 selected by the button selection data from the screen data storage part 52 so as to be displayed on the display 21. The following describes the cases of selecting the respective screens W2 and W3.

Figure 5:
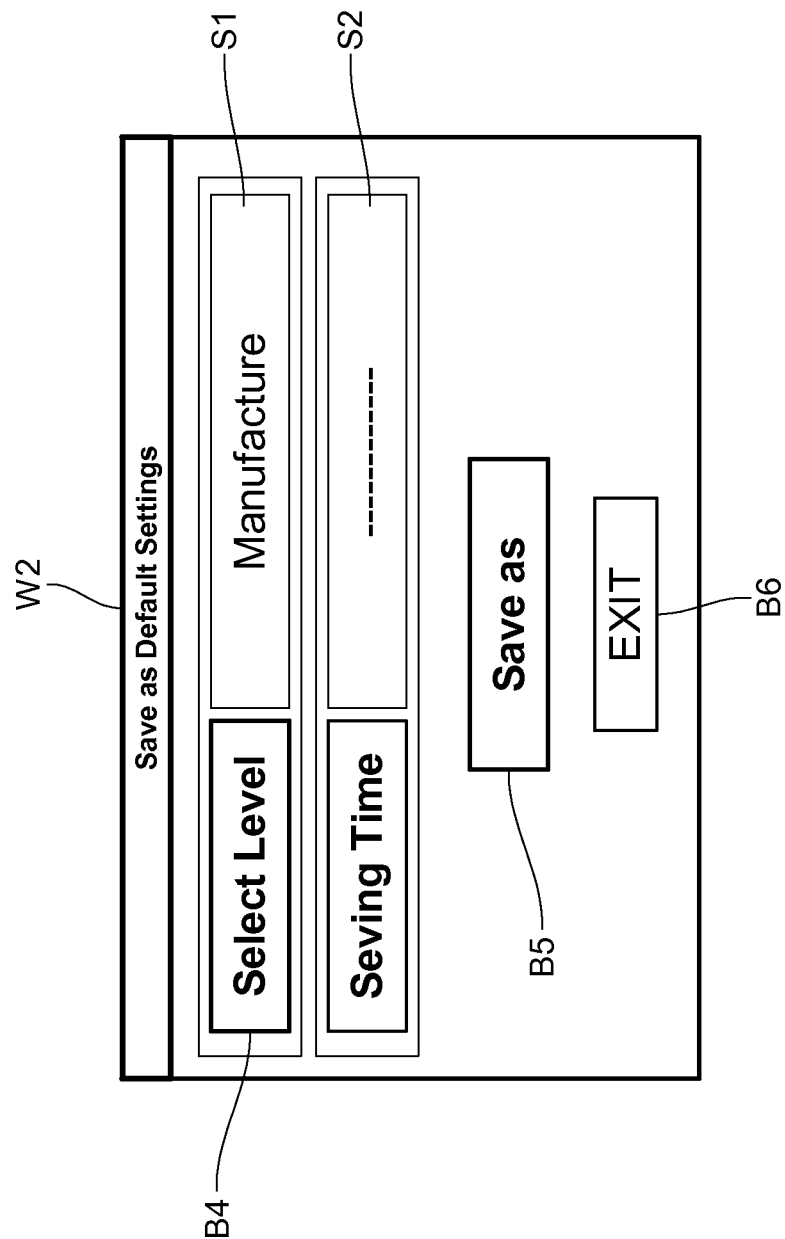
FIG. 5 is a diagram showing a setting information saving screen of the same embodiment.

In the case where the setting information saving screen button B1 is selected by an operator, the display control part 51 retrieves the setting information saving screen data indicating the setting information saving screen W2 from the screen data storage part 52 so as to display the setting information saving screen W2 on the display 21 as shown in FIG. 5.

This setting information saving screen W2 is a screen for saving the setting information of each part constituting the first exhaust gas analyzing device 2, and this screen W2 includes: a setting information selection button ("Select Level") B4 for selecting whether saving initial setting information ("Manufacture") of the exhaust gas analyzing device 2 in a product shipment state or saving setting information ("Service") of the exhaust gas analyzing device 2 that has been subjected to a maintenance; a selection information display section 51 indicating the setting information selected by the corresponding setting information selection button B4; a saving year, month and day display section S2 displaying a saving year, month and day when the setting information was saved; and a saving button ("Save as") B5 for saving these setting information. Further, a close button ("EXIT") B6 for closing the setting information saving screen W2 is also included.

Next, the following describes the case where an operator selects the initial setting information ("Manufacture") in the setting information selection button B4 in order to save the initial setting information before the product shipment of the exhaust gas analyzing device 2. In the case where an operator selects the initial setting information by the input means 505 such as a mouse and clicks the saving button B5, the selection input signal thereof is received by the input receiving part 53. Then, this selection input signal is transmitted to the initial setting data retrieving part 54.

The initial setting data retrieving part 54 retrieving this selection input signal retrieves the initial setting data indicating the initial setting information thereof from each part of the exhaust gas analyzing device 2 (for example, a gas analyzer contained in the exhaust gas analyzing device 2 and the like). Herein, as the initial setting information, there may be used every parameter (setting value) to be set to each part constituting the exhaust gas analyzing device 2, for example, information of the gas analyzers constituting the exhaust gas analyzing device 2, calculation factors such as a calibration curve factors and calibration factors for calculating concentrations of measurement components in these gas analyzers, ON/OFF operation information of each electromagnetic valve provided on the exhaust gas analyzing line (for example, an exhaust gas flow passage provided inside the exhaust gas analyzing device 2), alarm upper and lower limit setting information, air-frame ratio (AFR) calculation setting information, exhaust gas recirculation rate (EGR) calculation setting information and the like. The initial setting data retrieving part 54 stores the retrieved initial setting data in the setting data storage part 55. The time of storing the initial setting data in the setting data storage part 55 is displayed in the saving year, month and day display section S2 of the setting information saving screen W2. In order that the initial setting data saved in this way will not be changed thereafter, it is desirable to configure that, the initial setting information cannot be selected by, for example, the setting information selection button B4 after the initial setting data is once saved, or such that, even if the initial setting information is selected by the setting information selection button B4, the saving button B5 cannot be clicked.

Next, the following describes the case where an operator selects the maintenance setting information ("Service") in the setting information selection button B4 in order to update the maintenance setting data after a regular maintenance (overhaul) of the exhaust gas analyzing device 2. In the case where an operator selects the maintenance setting information by the input means 505 such as a mouse and clicks the saving button B5, the selection input signal thereof is received by the input receiving part 53. Then, this selection input signal is transmitted to the maintenance setting data update part 56.

The maintenance setting data updating part 56 retrieving this selection input signal retrieves the maintenance setting data indicating the maintenance setting information set or changed by the maintenance from each part of the exhaust gas analyzing device 2 (for example, a gas analyzer contained in the exhaust gas analyzing device 2 and the like). Herein, as the maintenance setting information, similarly to the initial setting information, there may be used every parameter (setting value) to be set to each part constituting the exhaust gas analyzing device 2, including setting items which are not included at the time of product shipment in addition to items included in the initial setting information, for example, in the case where a gas analyzer is newly added, a setting value for controlling the corresponding gas analyzer, and a calibration curve factor and calibration factor, etc., for calculating gas components of the corresponding gas analyzer are included. Then, the maintenance setting data updating part 56 stores the retrieved maintenance setting data in the setting data storage part 55. The time of storing the maintenance setting data in the setting data storage part 55 is displayed in the saving year, month and day display section S1 of the setting information saving screen W2.

Herein, in the case where the maintenance setting data updating part 56 stores the maintenance setting data in the first maintenance in the setting data storage part 55, it is stored in a storage region different from the initial setting data storage region in the setting data storage part 55. In addition, in the case where the maintenance setting data updating part 56 stores the maintenance setting data in the second and subsequent maintenances in the setting data storage part 55, the already stored maintenance setting data is overwritten with new maintenance setting data so as to be updated (see FIG. 6). This results in that the latest maintenance setting data together with the initial setting data are stored in the setting data storage part 55.

Figure 7:
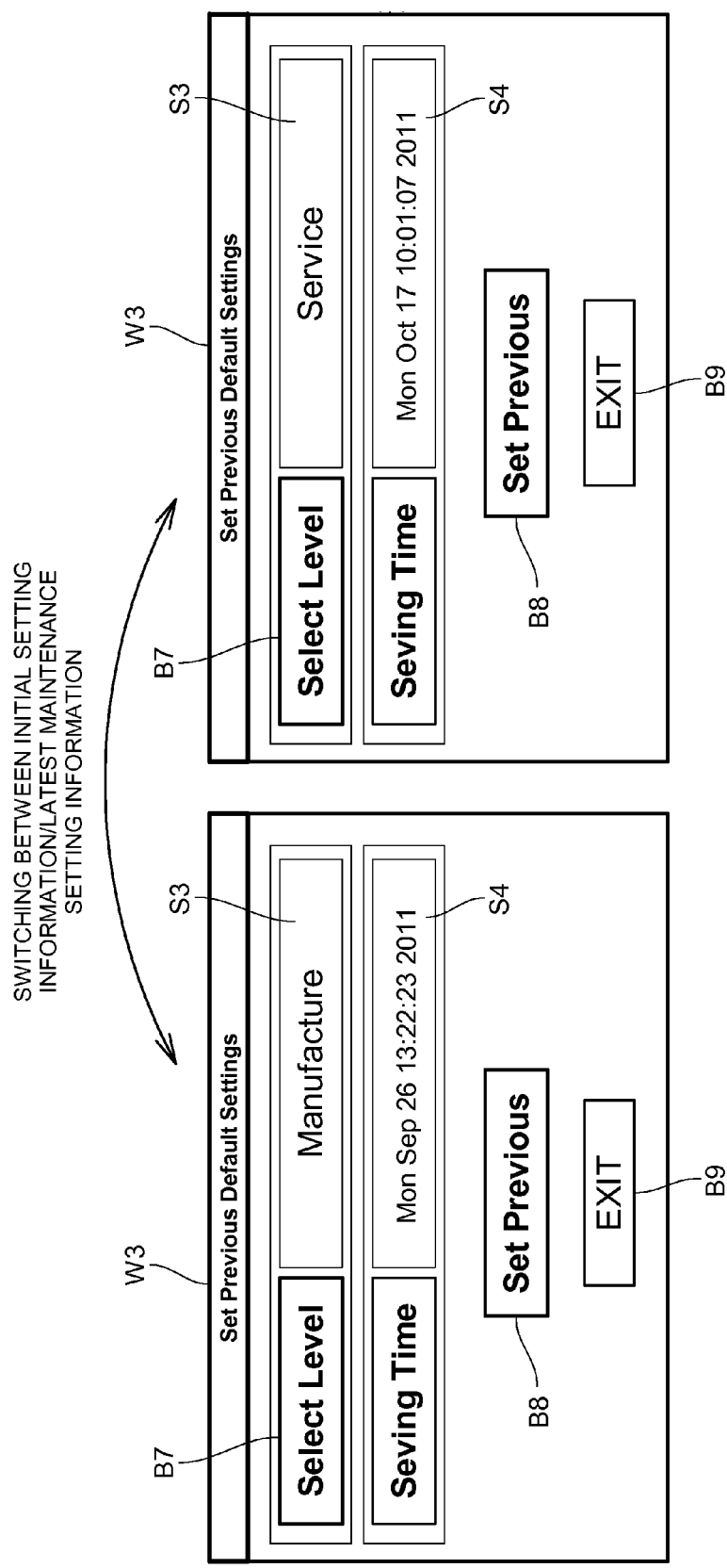
FIG. 7 is a diagram showing a setting selection screen (reset selection screen) of the same embodiment.

Next, in the case where the reset selection screen button B2 is selected by an operator, the display control part 51 retrieves the reset selection screen data indicating the reset selection screen W3 from the screen data storage part 52 so as to display the reset selection screen W3 on the display 21 as shown in FIG. 7.

This reset selection screen W3 is a screen for resetting the setting of the exhaust gas analyzing device 2 to the initial setting information or the latest maintenance setting information during the maintenance, and this screen W3 includes: a reset setting information selection button ("Select Level") B7 for selecting whether resetting to the initial setting information ("Manufacture") of the exhaust gas analyzing device 2 or resetting to the latest maintenance setting information ("Service"); a selection information display section S3 indicating the setting information selected by the corresponding reset setting information selection button B7; a saving year, month and day display section S4 displaying a saving year, month and day when the setting information was saved; and a reset button ("Set Previous as") B8 for resetting the setting of the exhaust gas analyzing device. Further, a close button ("EXIT") B9 for closing the setting selection screen is also included.

In a state that the reset selection screen W3 is being displayed, the operator selects, by the reset setting information button B7, as to which one of the initial setting information or the maintenance setting information, the setting of the exhaust gas analyzing device 2 should be reset to. At this time, if any of the initial setting information or the maintenance setting information is selected by the reset selection button B7, the saving year, month and day of the corresponding setting information is displayed in the saving year, month and day display section S4. Then, if the operator clicks the reset button ("Set Previous") B8 by the input means 505 such as a mouse, the setting information selecting data corresponding to the input data is received by the input receiving part 53. Then, the setting information selection data is transmitted to the setting reset part 57.

Figure 6:
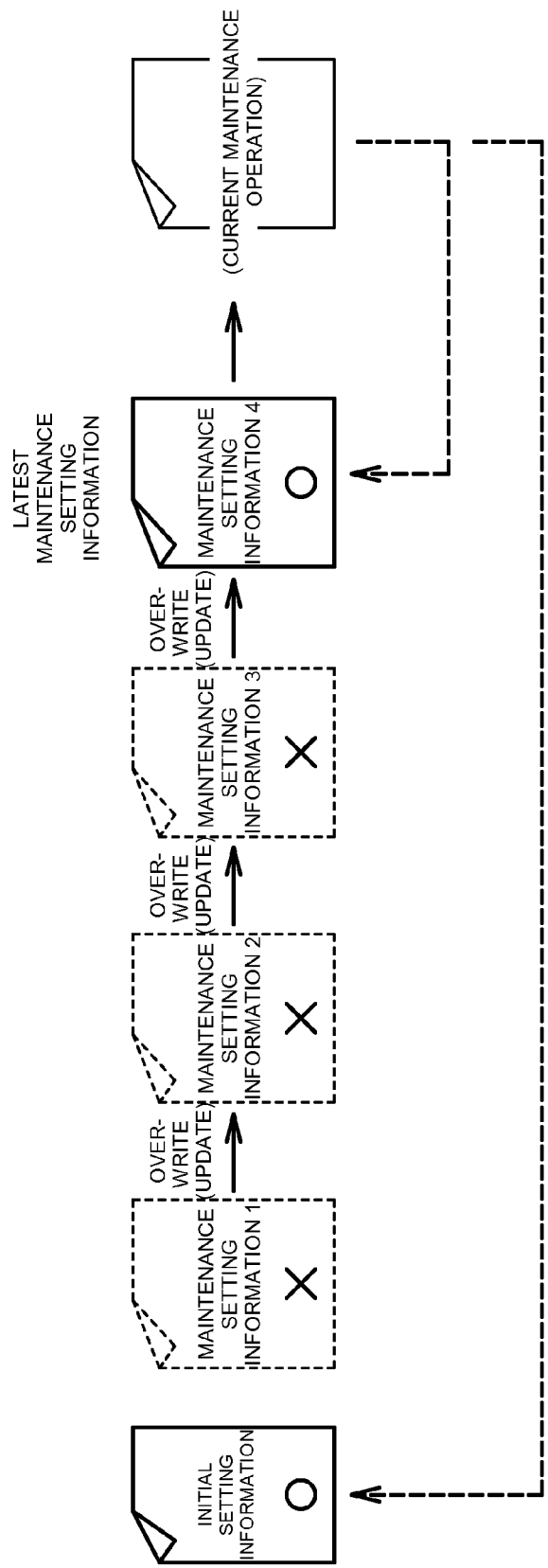
FIG. 6 is a conceptual diagram of setting information saving of the same embodiment.

The setting reset part 57 retrieving the setting information selection data retrieves the setting information indicated by the setting information selection data from the setting data storage part 55 and cancels the setting information of the exhaust gas analyzing device 2 changed by the present maintenance so as to reset to the setting information indicated by the retrieved setting data. Herein, as shown in FIG. 6, the setting information for use in resetting by the setting reset part 57 is any one of the initial setting information at the time of product shipment or the latest maintenance setting information.

Thus, in the current maintenance operation, in the case where an operator resets the setting change of each part so as to redesign the setting change from the first in the current maintenance operation, the operator can select one of two courses, returning to the initial setting or returning to the latest maintenance setting. In addition, in the current maintenance operation, if the setting is reset to the latest maintenance so as to be in the setting in the current maintenance operation without changing the corresponding maintenance setting, the existing maintenance setting data is overwritten in the setting data storage part 55 with the maintenance setting data indicated by the same maintenance setting information.

According to the exhaust gas analyzing system 100 according to the present embodiment configured like this, since the exhaust gas analyzing device includes the setting data storage part 55 and the initial setting data and the latest maintenance setting data are stored in the setting data storage part 55, the setting of the exhaust gas analyzing device 2 can be returned to the initial setting or the latest maintenance setting only by reading the initial setting data or the latest maintenance data stored in the setting data storage part 55. In this way, the setting work of the exhaust gas analyzing device at the time of maintenance can be facilitated. Also, there is no need to prepare the initial setting data using the external recording medium.

In addition, the present invention should not be limited to the embodiment described above. For example, although the first exhaust gas analyzing device includes the management device in the embodiment described above, the second exhaust gas analyzing device may include the management device, since each analyzing device and the central information processing unit are connected via a network, the central information processing unit may have a function of the management device.

In addition, the present invention should not be limited the present embodiment, and various modifications are of course possible within the scope unless departing from the intended spirit thereof.

REFERENCE SIGNS LIST

100 . . . Exhaust gas analyzing system
2 . . . Exhaust gas analyzing device
21 . . . Display
5 . . . Management device
51 . . . Display control part
52 . . . Screen data storage part
53 . . . Input receiving part
54 . . . Initial setting data retrieving part
55 . . . Setting data storage part
56 . . . Maintenance setting data updating part
57 . . . Setting reset part
W1 . . . Process selection screen
W2 . . . Setting information saving screen
W3 . . . Setting selection screen

The invention claimed is:

1. An exhaust gas analyzing device for analyzing components contained in exhaust gas comprising:
a maintenance setting data updating part adapted to overwrite stored maintenance setting data when the stored maintenance setting data is updated with latest maintenance setting data; and
a setting data storage part adapted to store
initial setting data indicating initial setting information of each part constituting the exhaust gas analyzing device in a state of product shipment, and
the latest maintenance setting data indicating latest maintenance setting information of each part constituting the exhaust gas analyzing device in a state of latest maintenance such that the setting data storage part stores the initial setting data and latest maintenance setting data but not previous versions of the stored maintenance setting data, and each part constituting the exhaust gas analyzing device can be returned to an initial setting in response to the initial setting data being selected during maintenance or to a latest maintenance setting in response to the latest maintenance setting data being selected during maintenance, the latest maintenance setting data including items which are included in the initial setting information and items which are not included in the state of product shipment.

2. The exhaust gas analyzing device according to claim 1 further comprising a maintenance setting data updating part adapted to update the latest maintenance setting data stored in the setting data storage part every time the exhaust gas analyzing device is subjected to maintenance.

3. The exhaust gas analyzing device according to claim 1 further comprising a setting reset part adapted to reset the setting of each part constituting the exhaust gas analyzing device to initial setting information indicated by the initial setting data or the latest maintenance setting information indicated by the latest maintenance setting data.

4. The exhaust gas analyzing device according to claim 3 further comprising a display control part adapted to display a setting selection screen on a display for selecting the initial setting information or the latest maintenance setting information, wherein the setting reset part retrieves the setting data indicating the initial setting information or the latest maintenance setting information selected by the setting selection screen from the setting data storage part.

5. A management device for an exhaust gas analyzing device for analyzing components contained in exhaust gas comprising:
a maintenance setting data updating part adapted to overwrite stored maintenance setting data when the stored maintenance setting data is updated with latest maintenance setting data; and
a setting data storage part adapted to store
initial setting data indicating initial setting information of each part constituting the exhaust gas analyzing device in a state of product shipment, and
the latest maintenance setting data indicating latest maintenance setting information of each part constituting the exhaust gas analyzing device in a state of latest maintenance such that the setting data storage part stores the initial setting data and latest maintenance setting data but not previous versions of the stored maintenance setting data, and each part constituting the exhaust gas analyzing device can be returned to an initial setting in response to the initial setting data being selected during maintenance or to a latest maintenance setting in response to the latest maintenance setting data being selected during maintenance, the latest maintenance setting data including items which are included in the initial setting information and items which are not included in the state of product shipment.

6. A management program for an exhaust gas analyzing device for analyzing components contained in exhaust gas, the management program for causing a computer to execute functions as
a maintenance setting data updating part adapted to overwrite stored maintenance setting data when the stored maintenance setting data is updated with latest maintenance setting data, and a setting data storage part adapted to store
- initial setting data indicating initial setting information of each part constituting the exhaust gas analyzing device in a state of product shipment, and
- the latest maintenance setting data indicating latest maintenance setting information of each part constituting the exhaust gas analyzing device in a state of latest maintenance such that the setting data storage part stores the initial setting data and latest maintenance setting data but not previous versions of the stored maintenance setting data, and each part constituting the exhaust gas analyzing device can be returned to an initial setting in response to the initial setting data being selected during maintenance or to a latest maintenance setting in response to the latest maintenance setting data being selected during maintenance, the latest maintenance setting data including items which are included in the initial setting information and items which are not included in the state of product shipment.

* * * * *